(12) United States Patent
Oyman

(10) Patent No.: US 11,704,867 B2
(45) Date of Patent: Jul. 18, 2023

(54) METHODS FOR TIMED METADATA PRIORITY RANK SIGNALING FOR POINT CLOUDS

(71) Applicant: Intel Corporation, Santa Clara, CA (US)

(72) Inventor: Ozgur Oyman, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 63 days.

(21) Appl. No.: 17/032,630

(22) Filed: Sep. 25, 2020

(65) Prior Publication Data
US 2021/0019936 A1  Jan. 21, 2021

Related U.S. Application Data

(60) Provisional application No. 62/909,598, filed on Oct. 2, 2019, provisional application No. 62/907,342, filed on Sep. 27, 2019.

(51) Int. Cl.
*G06T 17/00* (2006.01)
(52) U.S. Cl.
CPC .... *G06T 17/00* (2013.01); *G06T 2207/10028* (2013.01)
(58) Field of Classification Search
None
See application file for complete search history.

(56) References Cited

U.S. PATENT DOCUMENTS

| 2018/0314698 A1* | 11/2018 | Babushkin | G06F 16/951 |
| 2022/0028119 A1* | 1/2022 | Rhyu | G06T 9/001 |
| 2022/0038791 A1* | 2/2022 | Curcio | H04N 21/845 |

OTHER PUBLICATIONS

3GPP, "Technical Specification Group Services and System Aspects; Transparent end-to-end packet switched streaming service (PSS); 3GPP file format (3GP) (Release 15)," 3GPP TS 26.244 V15.0.0 (Jun. 2018), 5G, 67 pages.

* cited by examiner

*Primary Examiner* — Frank S Chen
(74) *Attorney, Agent, or Firm* — Schwabe, Williamson & Wyatt, P.C.

(57) ABSTRACT

Embodiments herein provide techniques for signaling of priority information (e.g., priority ranking) and/or quality information in a timed metadata track associated with point cloud content. For example, embodiments include procedures for signaling of priority information and/or quality information in a timed metadata track to support viewport-dependent distribution of point cloud content, e.g., based on MPEG's International Organization for Standardization (ISO) Base Media File Format (ISOBMFF). In some embodiments, metadata samples of the timed metadata track may include priority information and/or quality information for a point cloud bounding box of a point cloud media presentation (e.g., for one or more point cloud objects in the point cloud bounding box). Other embodiments may be described and claimed.

28 Claims, 12 Drawing Sheets

METHODS FOR TIMED METADATA PRIORITY RANK SIGNALING FOR POINT CLOUDS

CROSS REFERENCE TO RELATED APPLICATION

The present application claims priority to U.S. Provisional Patent Application No. 62/907,342, which was filed Sep. 27, 2019, and U.S. Provisional Patent Application No. 62/909,598, which was filed Oct. 2, 2019, the disclosures of which are hereby incorporated by reference.

FIELD

Embodiments relate generally to the technical field of wireless communications.

BACKGROUND

Volumetric content distribution is gaining traction to deliver 6 degrees of freedom (6DoF) immersive media experiences. Content distribution technologies need to support point cloud content.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
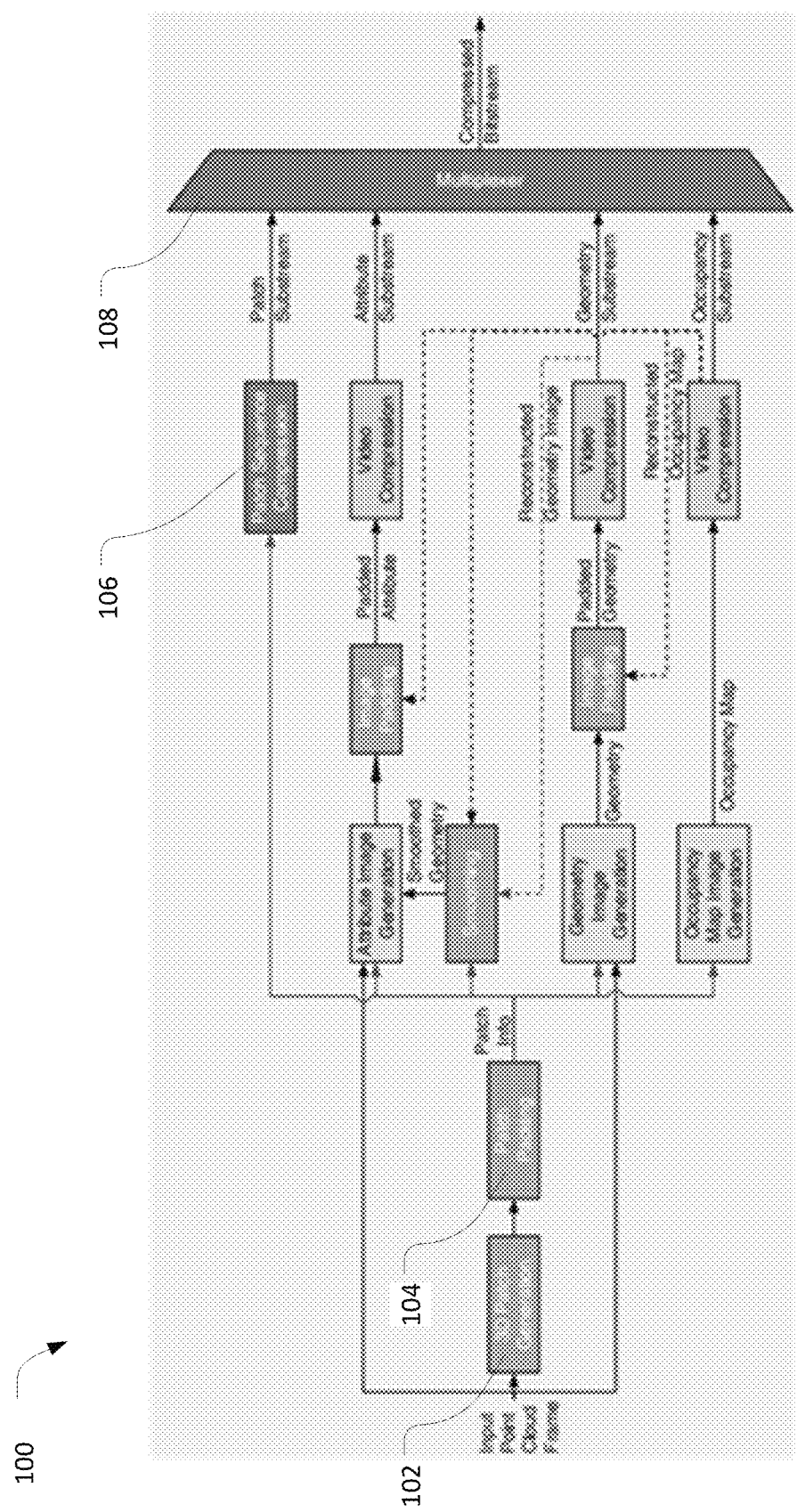
FIG. 1 illustrates a video-based point cloud coding (V-PCC) architecture in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

Embodiments herein provide techniques for signaling of priority information (e.g., priority ranking) and/or quality information in a timed metadata track associated with point cloud content. For example, embodiments include procedures for signaling of priority information and/or quality information in a timed metadata track to support viewport-dependent distribution of point cloud content, e.g., based on MPEG's International Organization for Standardization (ISO) Base Media File Format (ISOBMFF). In some embodiments, metadata samples of the timed metadata track may include priority information and/or quality information for a point cloud bounding box of a point cloud media presentation (e.g., for one or more point cloud objects in the point cloud bounding box).

Volumetric content distribution is gaining traction to deliver 6DoF immersive media experiences. Content distribution technologies such as MPEG's ISOBMFF need to support point cloud content. Quality and priority indication during streaming of volumetric content is essential in order to enable viewport dependent delivery and thereby optimize bandwidth utilization and quality of user experience. This disclosure provides ISOBMFF-based timed metadata track priority rank signaling procedures to support viewport-dependent distribution of point cloud content.

Point Clouds and 6DoF

Initial VR360 support was limited to 3 degrees of freedom (3DoF), which means that the viewing pose is only alterable through rotations on the x, y and z axes, represented as roll, pitch and yaw respectively, and purely translational movement does not result in different media being rendered. As such, VR360 delivered an overall flat experience since it positions the viewer in a static location with limited freedom of movement and low levels of interactivity. This was a limitation in the sense that fully immersive experiences were not possible thereby hurting the user experience and sense of realism. Emerging VR standards and products will provide support for 3DoF+ and 6 degrees of freedom (6DoF) enhancing the level of immersion and user experience. While 3DoF+ restricts modifications of the viewing position by limiting translational movements of the user's head around the original viewpoint, 6DoF supports both rotational and translational movements allowing the user to change not only orientation but also position to move around in the observed scene. As part of its "Coded Representation of Immersive Media" (MPEG-I) project, MPEG is currently developing the codecs, storage and distribution formats, and rendering metadata necessary for delivering interoperable and standards-based immersive 3DoF+ and 6DoF experiences.

Volumetric video has been recently gaining significant traction in delivering 6DoF experiences. Volumetric video contains spatial data and enables viewers to walk around and interact with people and objects, and hence it is far more immersive than 360 video footage because it captures the movements of real people in three dimensions. Users can view these movements from any angle by using positional tracking. Point clouds are a volumetric representation for describing 3D objects or scenes. A point cloud comprises a set of unordered data points in a 3D space, each of which is specified by its spatial (x, y, z) position possibly along with other associated attributes, e.g., RGB color, surface normal, and reflectance. This is essentially the 3D equivalent of well-known pixels for representing 2D videos. These data points collectively describe the 3D geometry and texture of the scene or object. Such a volumetric representation lends itself to immersive forms of interaction and presentation with 6DoF. Some aspects of point clouds include:

Point cloud is a form of representing 3D environments.
A point cloud is a set of points {v}, each point v having a spatial position (x, y, z) comprising the geometry and a vector of attributes such as colors (Y, U, V), normals, curvature or others.
A point cloud may be voxelized by quantizing the point positions to lie on an integer grid within a bounding cube.=> Allows for more efficient real time processing
Cube of voxels in 3D are somewhat equivalent of Pixels in 2D
A voxel is said to be occupied if it contains any point of the point cloud.
Higher level representation that color and depth maps Since such point cloud representations require a large amount of data, development of efficient compression techniques is desirable in order to reach consumers using typical broadband access systems.

FIG. 1 provides an example video-based point cloud coding (V-PCC) architecture 100 in accordance with various embodiments. The V-PCC architecture 100 may allow reusing the legacy video codecs such as H.264/AVC and H.265/HEVC. In particular, the 3D geometry and attribute data of the point cloud are transformed into a set of 2D patches. Such patches are then packed into images, which can then be compressed with any existing or future image or video codec, such as MPEG-4 advanced video coding (AVC), high-efficiency video coding (HEVC), AV1, etc.

V-PCC exploits a patch-based approach to segment the point cloud into a set of clusters (also referred to as patches), e.g., by patch generation block 102 and patch packing block 104. These patches can be mapped to a predefined set of 2D planes through orthogonal projections, without self-occlusions and with limited distortion. The objective is to find a temporally coherent, low-distortion, injective mapping, which would assign each point of the 3D point cloud to a cell of the 2D grid. A mapping between the point cloud and a regular 2D grid is then obtained by packing the projected patches in the patch-packing process.

All patch information that is required to reconstruct the 3D point cloud from the 2D geometry, attribute, and occupancy videos also needs to be compressed. Such information is encoded in the V-PCC patch sequence substream (e.g., at block 106). V-PCC introduces a new codec specifically optimized to handle this substream, which occupies a relatively small amount of the overall bitstream (e.g., lower than 5%). Additional information needed to synchronize and link the video and patch substreams is also signaled in the bitstream.

The V-PCC bitstream is then formed by concatenating the various encoded information (e.g., occupancy map, geometry, attribute, and patch sequence substreams) into a single stream (e.g., at multiplexer 108). This is done by encapsulating these substreams into V-PCC data units, each consisting of a header and a payload.

The V-PCC unit header describes the V-PCC unit type. Currently, five different unit types are supported. The sequence parameter set (SPS) unit type describes the entire V-PCC bitstream and its subcomponents. The remaining unit types include the occupancy-video, geometry-video, attribute-video, and patch-sequence data units, which encapsulate the occupancy map, geometry, attribute, and patch sequence sub streams, respectively.

The V-PCC decoding process is split into two phases: 1) the bitstream decoding process and 2) the reconstruction process. The bitstream decoding process takes as input the V-PCC compressed bitstream and outputs the decoded occupancy, geometry, and attribute 2D video frames, together with the patch information associated with every frame.

The reconstruction process uses the patch information to convert the 2D video frames into a set of reconstructed 3D point-cloud frames. The reconstruction process requires the occupancy, geometry, and attribute video sequences to be resampled at the nominal 2D resolution specified in the SPS. The resampled videos are then used for the 3D reconstruction process, which includes two main steps: 1) the geometry and attribute reconstruction and 2) the geometry and attribute smoothing.

The patch-packing process is constrained to guarantee no overlapping between patches. Furthermore, the bounding box of any patch, expressed in terms of T×T blocks, where T is the packing block size, should not overlap with any T×T block belonging to a previously encoded patch. Such constraints make it possible to determine, for each T×T block of the packing grid, the patch to which it belongs by analyzing the 2D bounding boxes of all patches.

The T×T blocks are then processed in parallel to generate the point-cloud geometry and attributes. For each cell of a T×T block, the corresponding pixel in the occupancy map is used to determine whether the cell is full or empty. If the cell is full, a 3D point is generated following two different procedures, depending on the type of the patch.

V-PCC supports the concept of regular patches, which use the patch projection method described earlier. For regular patches, the 3D point Cartesian coordinates are computed by combining the depth information stored in the geometry image with the cell's 2D location, the patch's 3D offset, and the 2D projection plane. The attribute values associated with the reconstructed points are obtained by sampling the 2D attribute frames at the same grid location.

Dynamic Adaptive Streaming Over HTTP (DASH)

Hypertext transfer protocol (HTTP) streaming is spreading widely as a form of multimedia delivery of Internet video. HTTP-based delivery provides reliability and deployment simplicity due to the already broad adoption of both HTTP and its underlying TCP/IP protocols. DASH provides an overview of elements and attributes that may be used to describe components and properties of a media presentation in an MPD. The MPD is a metadata file that provides information on the structure and different versions of the media content representations stored in one or more server(s) including different bitrates, frame rates, resolutions, codec types, etc. In addition, DASH also specifies the segment formats, for example, containing information on the initialization and media segments for the media engine to ensure mapping of segments into media presentation timeline for switching and synchronous presentation with other representations. Based on this MPD metadata information that describes the relation of the segments and how they form a media presentation, clients request the segments using HTTP GET or partial GET methods. The client fully controls the streaming session including management of on-time request and smooth playout of the sequence of segments, potentially adjusting bitrates or other attributes, for example, to react to changes of the device state or the user preferences.

Figure 2:
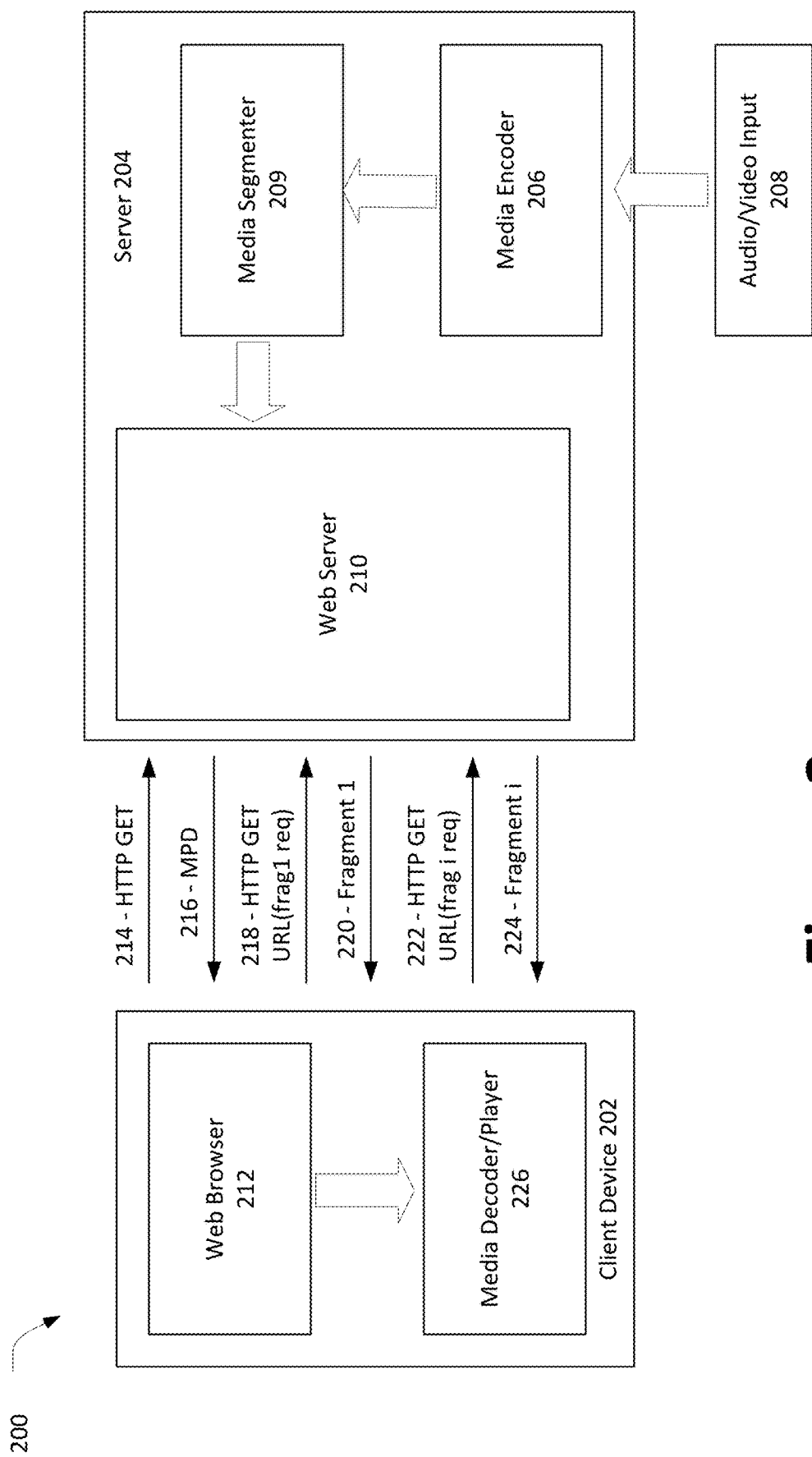
FIG. 2 illustrates a procedure for dynamic adaptive streaming over hypertext transfer protocol (DASH) streaming between a client device and a server, in accordance with various embodiments.

For example, FIG. 2 illustrates a procedure 200 for DASH streaming that may be performed by a client device 202 and web/media server 204. A media encoder 206 may receive media input (e.g., audio/video input) 208 and encode the received media (e.g., using a codec). The media encoder 206 may provide the encoded media to a media segmenter 209 that generates DASH segments from the encoded media. The segments are provided to a web server 210.

The client device 202 may include a web browser 212 that retrieves content from the web server 210 using HTTP GET requests. For example, the web browser 212 may send an HTTP GET request at 214 to request the MPD associated with a media presentation. At 216, the web server 210 may transmit the MPD to the web browser 212. The MPD may indicate an index of each segment and associated metadata information.

The web browser 212 may request fragments/segments of the media presentation based on the MPD. For example, at 218, the web browser 212 may request a Fragment 1 (e.g., HTTP GET URL(frag1 req)) from the web server 210. The URL in the HTTP GET request may indicate the segment that is requested by the client. At 220, the web server 210 may send Fragment 1 to the web browser 212. At 222, the web browser 212 may send a request for Fragment i to the web server 210, which is provided by the web server 210 at 224. The web browser 212 may provide the received fragments of the media presentation to a media decoder/player 226 of the client device 202.

Although the media encoder 206, media segmenter 209, and web server 210 are all illustrated as part of server 204, it will be understood that one or more of these elements may be included in separate devices in some embodiments.

ISO Base Media File Format

ISO base media file format (ISO/IEC 14496-12-MPEG-4 Part 12) defines a general structure for time-based multimedia files such as video and audio. The identical text is published as ISO/IEC 15444-12 (JPEG 2000, Part 12).

It is designed as a flexible, extensible format that facilitates interchange, management, editing and presentation of the media. The presentation may be local, or via a network or other stream delivery mechanism. The file format is designed to be independent of any particular network protocol while enabling support for them in general. It is used as the basis for other media file formats (e.g. container formats MP4 and 3GP). In 3GPP, a special instantiation of the ISO base media file format is specified in 3GPP TS 26.244 to serve as the 3GP file format for 3GPP systems.

Viewport Dependent Distribution of Point Cloud Video

Viewport-dependent delivery allows different areas/regions of the VR360 video to be delivered with different quality or resolution, realizing the best quality-bandwidth tradeoff. The same approach can be applicable for distribution of point cloud video content as well. Edge enhancements enabled by 5G can also help in improving viewport-dependent point cloud content delivery, where high quality viewport-specific video data (e.g., tiles) corresponding to portions of the point cloud content for different fields of view (FoVs) at various quality levels may be cached at the edge and delivered to the client device with very low latency based on the user's FOV information. Here are some example use cases:

On-demand: High quality point cloud/volumetric content is (potentially generated and) stored in the cloud and edge along with the various high quality viewport-specific video data (e.g., tiles) corresponding to portions of the content for different fields of view (FoVs) at various quality levels through multiple encodings. Then the service provider receives user's FoV information from the client device and only sends video data (e.g., tiles) that correspond to the user's current viewport in high quality. A lower quality encoding of the whole scene is streamed as well as a backup to handle any abrupt changes to the user FoV. As another option to this use case, instead of storing the various high quality viewport-specific video data at the edge, the service provider may generate these on-the-fly at the edge based on received user FoV information.

Live: High quality point cloud/volumetric content is captured live and pushed to the cloud and edge. This may potentially also involve live cloud-based production media workloads on the volumetric content, which may for instance include live point cloud or texture-and-mesh generation for volumetric video. Various high quality viewport-specific video data (e.g., tiles) corresponding to portions of the content for different fields of view (FoVs) can also be generated at various quality levels through multiple encodings in the cloud and pushed to the edge. Then the service provider receives user's FoV information from the client device and only sends video data (e.g., tiles) that correspond to the user's current viewport in high quality. A lower quality encoding of the whole scene is streamed as well as a backup to handle any abrupt changes to the user FoV. As another option to this use case, instead of storing the various high quality viewport-specific video data at the edge, the service provider may generate these on-the-fly at the edge based on received user FoV information.

Figure 3:
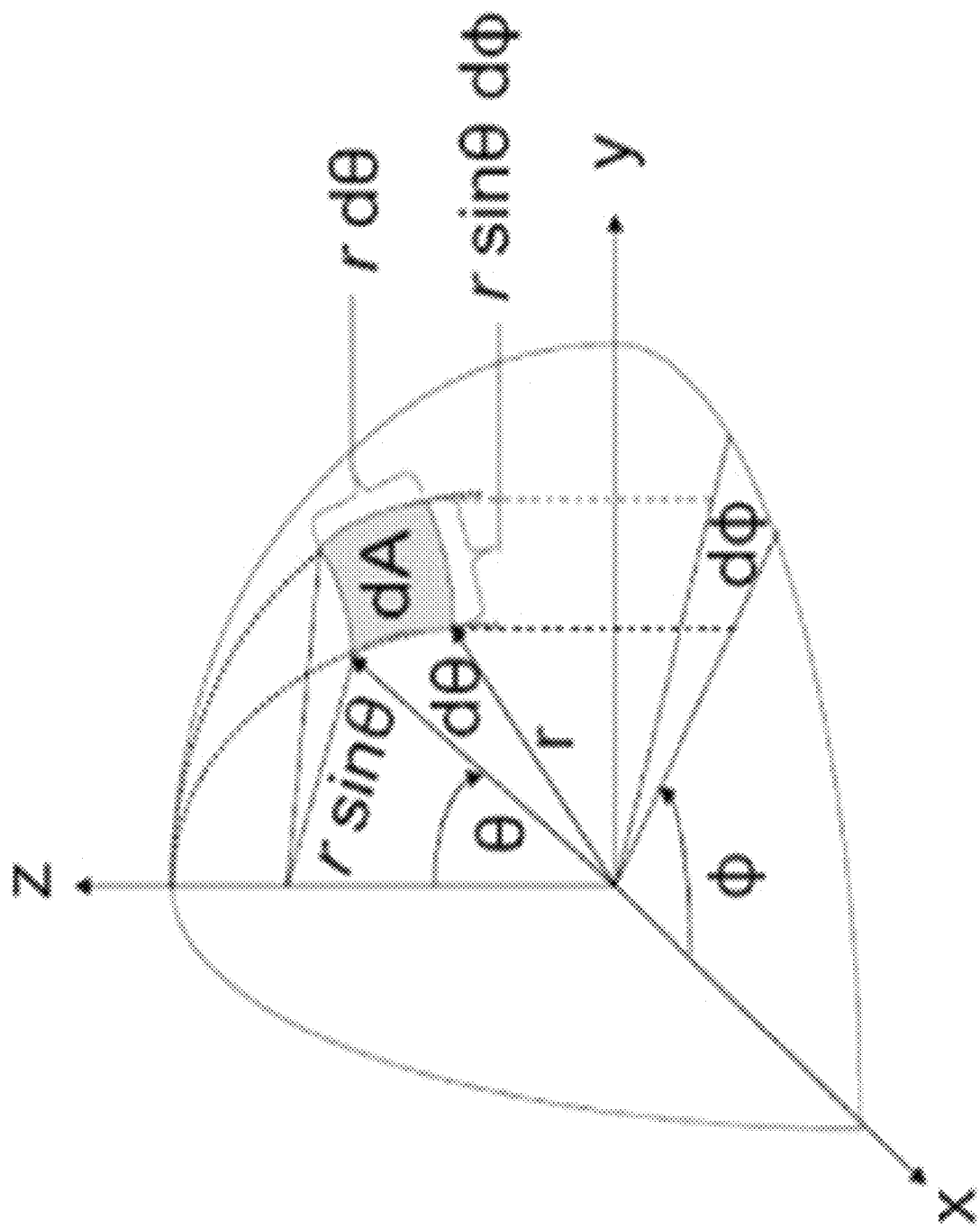
FIG. 3 illustrates viewport information for a region of interest in accordance with various embodiments.
Figure 4:
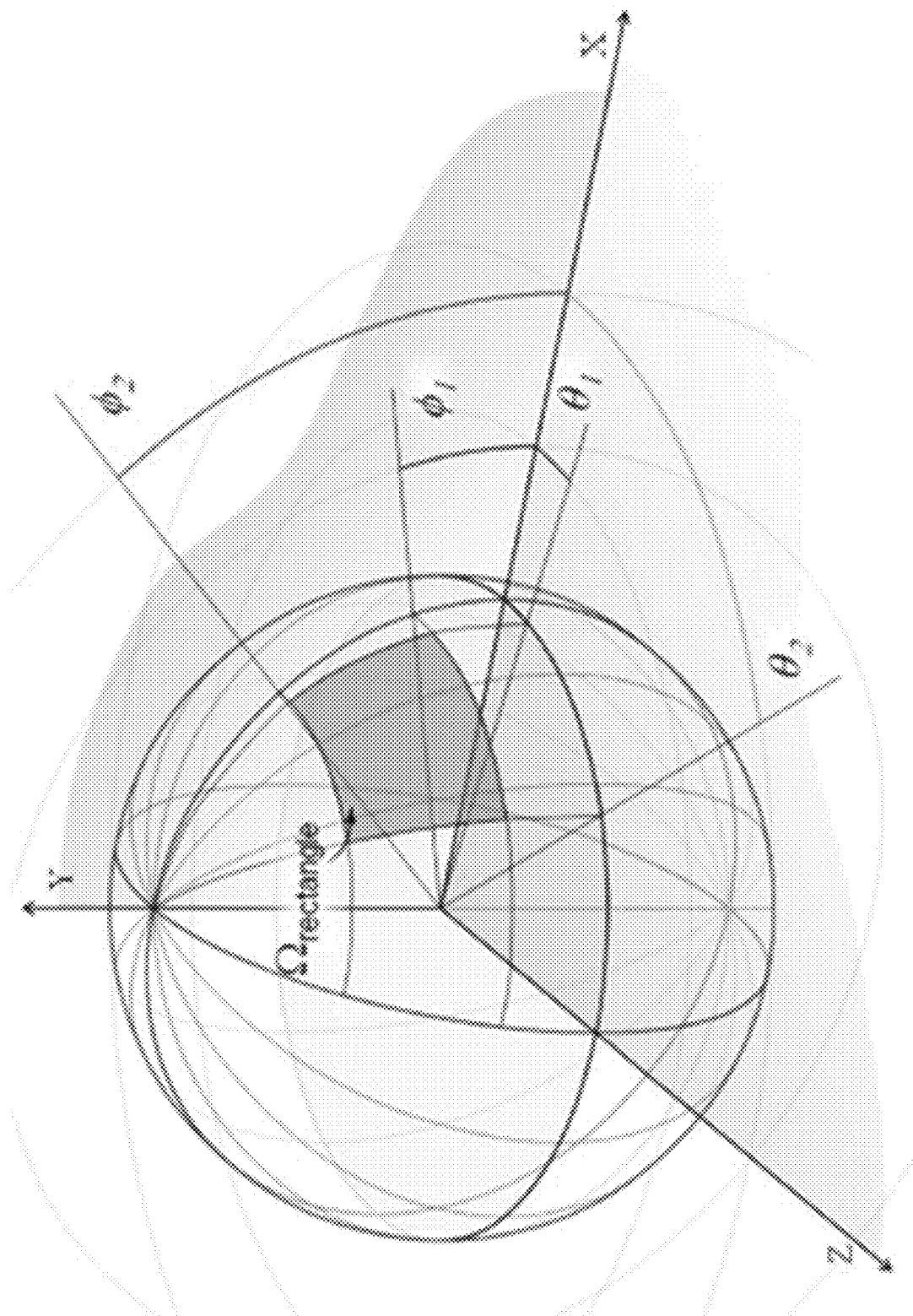
FIG. 4 illustrates angle parameters of viewport information in accordance with various embodiments.
Figure 5:
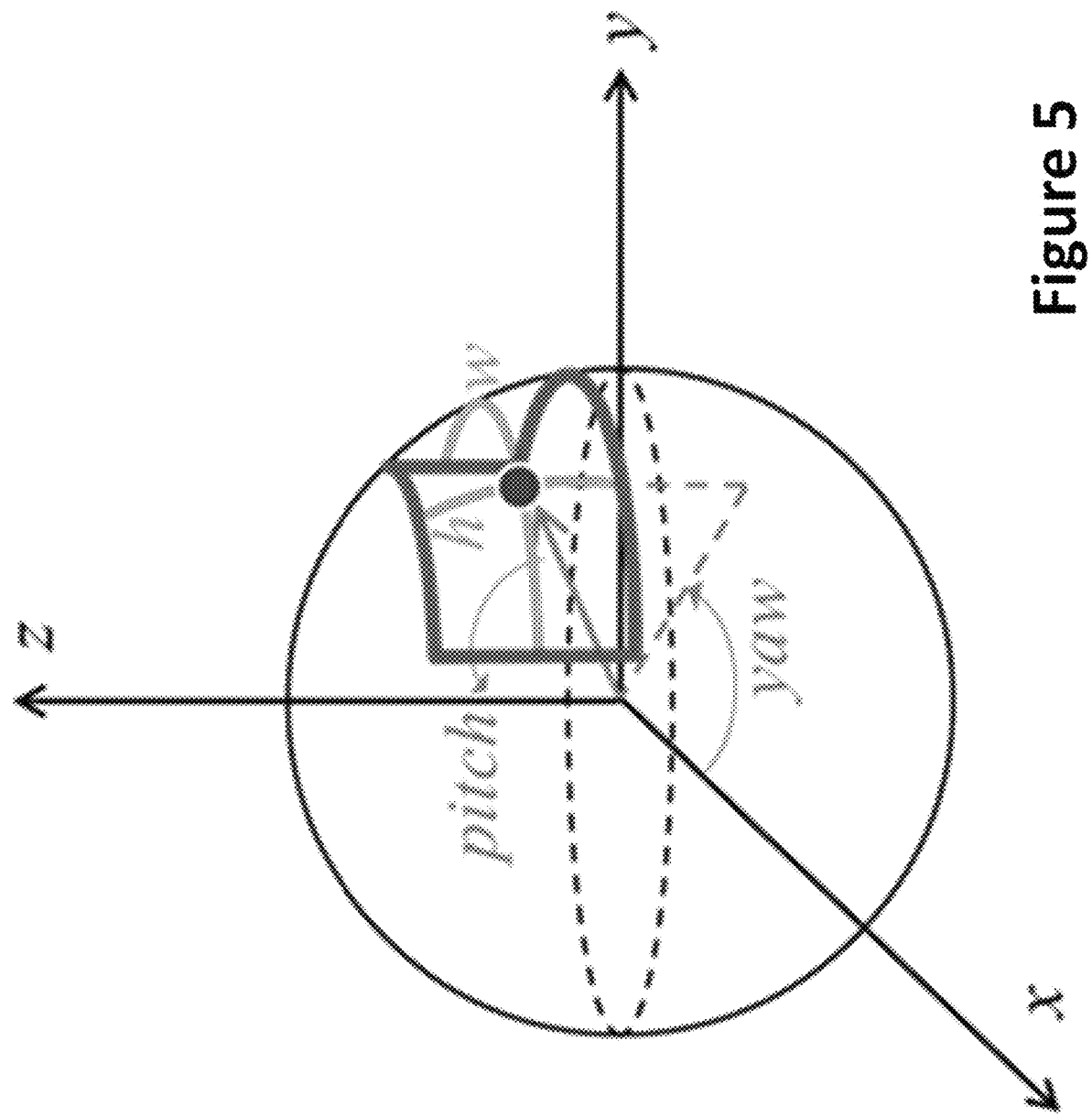
FIG. 5 illustrates additional parameters of viewport information in accordance with various embodiments.

Viewport dependent delivery is enabled by signalling the quality or priority associated to point cloud bounding regions or objects from the perspective of a particular viewport. The client can choose and request content according to its viewport. For point cloud videos, the region of interest (ROI) or viewport indication can be made using the spherical coordinate system shown in FIG. 3 to cover rotational movements of the viewport, plus the x-y-z coordinates of the center point of the sphere that contains the ROI or viewport (to cover translational movements of the viewport):

By providing angles information (dθ and dφ in spherical coordinates) to each of the differential areas (e.g., the dA in FIG. 3), the content provider can communicate its recommended ROI/viewport to the streaming client. This is depicted in FIG. 4, where ROI/viewport information is composed of communicating the θ1, θ2, φ1 and φ2 parameters, where θ1 is the angle between the VR origin and the left side of the differential area, θ2 is the angle between the VR origin and the right side of the differential area, φ1 is the angle between the VR origin and the top side of the differential area and φ2 is the angle between the VR origin and the bottom side of the differential area. This leads to the following definition of ROI/viewport parameters (depicted in FIG. 5):

ROI_yaw: signed integer in decimal representation expressing the yaw angle of the center of the desired ROI in arbitrary units ROI_pitch: signed integer in decimal representation expressing the pitch angle of center of the desired ROI in arbitrary units ROI_width: signed integer in decimal representation expressing the width in angular length of the desired ROI in arbitrary units ROI_height: signed integer in decimal representation expressing the height in angular length of the desired ROI in arbitrary units Center_x; non-negative integer in decimal representation expressing the x-coordinate of the center point of the sphere containing the desired ROI in arbitrary units.— this is to cover translational movements of the viewport Center_y: non-negative integer in decimal representation expressing the y-coordinate of the center point of the sphere containing the desired ROI in arbitrary units.— this is to cover translational movements of the viewport Center_z: non-negative integer in decimal representation expressing the z-coordinate of the center point of the sphere containing the desired ROI in arbitrary units.— this is to cover translational movements of the viewport ROI_start_pitch: non-negative integer in decimal representation expressing the starting pitch angle of the specific area of the sphere, corresponding to the desired ROI.

ROI_end_pitch: non-negative integer in decimal representation expressing the ending pitch angle of the specific area of the sphere, corresponding to the desired ROI.

ROI_start_yaw: non-negative integer in decimal representation expressing the starting yaw angle of the specific area of the sphere, corresponding to the desired ROI.

ROI_end_yaw: non-negative integer in decimal representation expressing the ending yaw angle of the specific area of the sphere, corresponding to the desired ROI.

Figure 6:
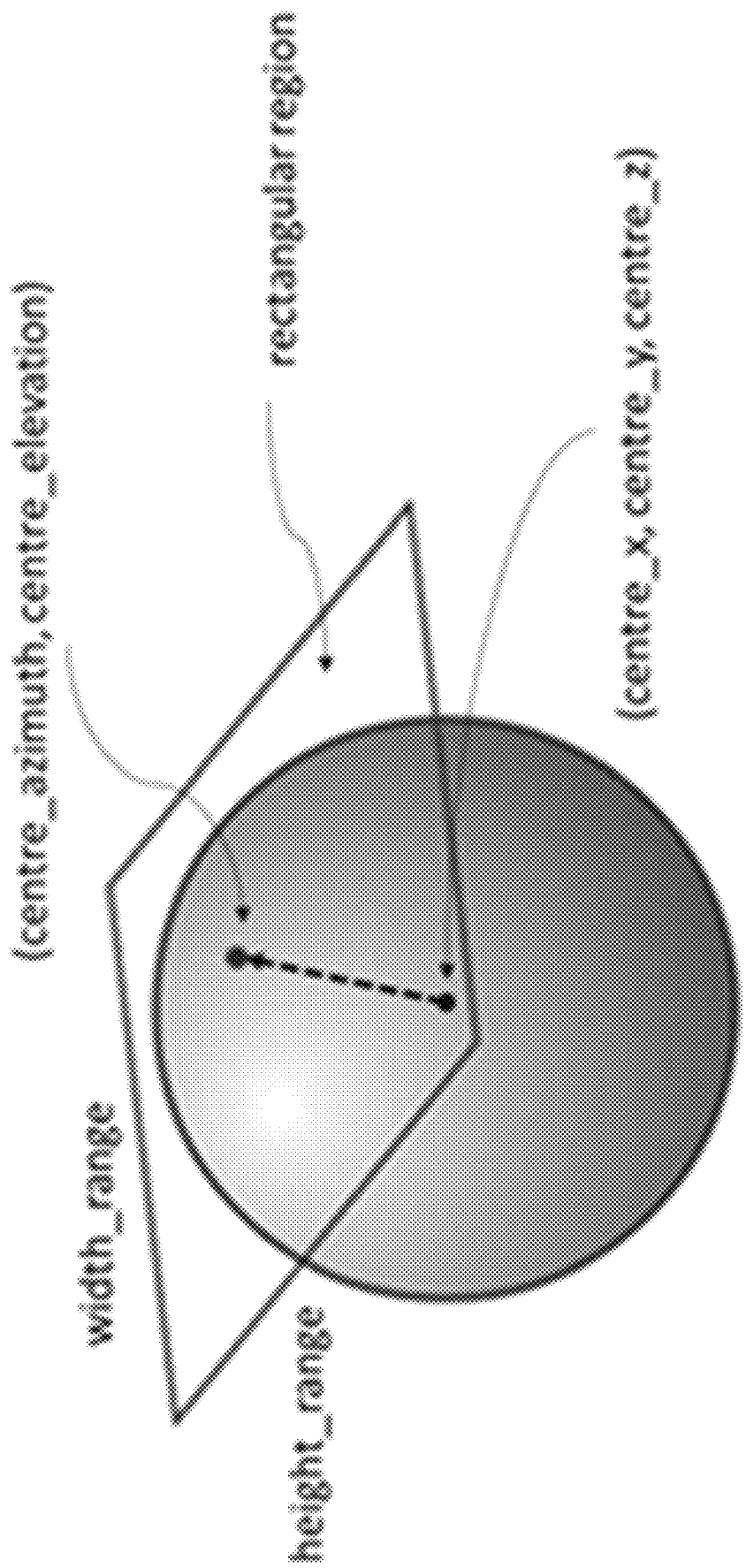
FIG. 6 illustrates viewport information for a two-dimensional (2D) planar region, in accordance with various embodiments.

Depending on user's viewing devices, a viewport can also be considered as a 2D planar region (instead of a 3D spherical region) in the 3D space with 6 degrees of freedom (6 DoF). In this case, the viewport is a 2D viewport with 2D rectangular regions, rather than 3D spherical regions, as shown in FIG. 6.

Carriage of Quality/Priority Information in the Timed Metadata Track

The timed metadata track of ISOBMFF can be the means to carry and convey various kinds of timed metadata information as part of ISOBMFF. ISO/IEC 23001-10 already provides different kinds of metadata that could be carried as part of the timed metadata track. Quality or priority information associated to point cloud data may also be carried as part of the timed metadata track.

Quality or priority information signaled in the timed metadata track could indicate the quality or priority ranking value of a particular region within the point cloud, e.g., this could be a bounding box (possibly cubical or spherical), and/or it could refer to a region containing a particular point cloud object. Moreover, this indication of quality or priority could be tied to a particular viewport, in this case, the indication of quality or priority information can be done on a per-viewport basis for a list of pre-defined viewports. It indicates a quality/priority ranking value of a given region (a bounding box, and/or point cloud object) in the point cloud relative to other quality/priority ranking point cloud regions.

For instance, priority information may be signaled in a viewport-dependent manner in order to prioritize across different point cloud bounding regions and/or objects on a per-viewport basis. For each chosen viewport, the related priority of the different regions over the point cloud (bounding box, and/or object) may be signaled along with the descriptors of each bounding box. The priority ranking values may be assigned by the content provider and how they are determined is implementation specific. As the viewport-dependent priority changes, such signaling also supports the ability to indicate the change in the relative priorities of the different point cloud regions or objects, e.g., since the priority indication is signaled on a per viewport basis for a set of pre-defined viewports.

As another option, the pre-defined viewports could be signaled at the DASH MPD level (e.g., as part of a DASH adaptation set or representation) and the corresponding priority ranking information could be signaled as part of the timed metadata track placed under the corresponding DASH adaptation set or representation. From the MPD, DASH client identifies the DASH adaptation set and corresponding representations based on the viewport, and for a given viewport the DASH client receives quality/priority information for each point cloud bounding box or object by downloading the corresponding timed metadata track files (which can be advertised in the MPD) and then based on that information and available bandwidth it tries to grab each point cloud region or object with the right quality and bandwidth—impacting the DASH adaptation logic.

Quality or priority information may be signaled either at the DASH MPD level or at the file format level, e.g., as part of the timed metadata track. In this section, we describe the signaling of quality/priority information using the timed metadata track.

The point cloud region for the quality or priority-ranking is specified by various syntax elements depending on how the bounding box regions are structured. Two example bounding box structures are (i) cubical, (ii) spherical. Below provide the semantics of elements and attributes of the metadata track descriptions with a cubical bounding box only (with the understanding that a similar description can be considered for spherical bounding boxes).

Moreover, it may be possible to indicate quality/priority ranking via specific contextual information (e.g., the position of the ball, position of a star player, etc.) along with (or instead of) the coordinate-based description of the bounding region. One way to signal this information would be to define a string value associated with each adaptation set to carry the relevant contextual information. Another option may be to signal an object_ID value, which refers to the specific point cloud object which may be assigned a particular quality or priority ranking. Yet another option may be to signal a patch ID value, which refers to the specific point cloud patch which may be assigned a particular quality or priority ranking. Object or patch ID information may be signalled in conjunction with the bounding region coordinate information in order to provide more specifics about the x-y-z coordinates and/or spherical coordinates associated to the point cloud object or patch.

In embodiments, each point cloud object may be associated with specific recommended viewports, including those signaled at the MPD level.

Potential Solution 1

Sample Entry Format

The sample entry of this sample type is specified as follows:

```
class PointCloudTimedMetadataSampleEntry( ) extends
MetaDataSampleEntry(type)
('pcmd') {
    unsigned int(8) metadata_type_indicator;
}
``` metadata_type_indicator indicates the types of timed metadata information which may be present in the PointCloudTimedMetadataSample samples that utilize this sample entry.
  (metadata_type_indicator & 0x01) equal to 1 indicates a relative quality information for the point cloud regions. A value of 0 indicates lowest quality.
  (metadata_type_indicator & 0x02) equal to 2 indicates a relative priority information for the point cloud regions. A value of 0 indicates lowest priority.
  (metadata_type_indicator & 0x04) equal to 4 indicates a heatmap signaling for point cloud regions. A value of 0 indicates lowest heatmap value.
  Value 0 is not allowed. Bits 3, 4 and 5 in LSB 0 notation are reserved. Bits 6 and 7 in LSB 0 notation are for user-defined metadata types.

Sample Format

Point cloud timed metadata sample shall be a PointCloudTimedMetadataSample, which shall be an array of MetadataInformationBoxes.

The types of information which may be present in the sample shall be indicated in the PointCloudTimedMetadataSampleEntry.

```
aligned(8) class MetadataInformationBox extends FullBox ('mibx', 0,
flags) {
unsigned int(8) metadata_type;
unsigned int(8) viewport_id;
unsigned int(8) num_regions;
```

```
for (i = 0; i < num_regions; i++)
    unsigned int(8) value[i];
}
aligned(8) class PointCloudRegions extends FullBox('pcrs', 0, flags) {
unsigned int(8) num_regions;
for (i = 0; i < num_regions; i++)
    unsigned int(8) center_x[i];
unsigned int(8) center_y[i];
unsigned int(8) center_z[i];
unsigned int(8) range_x[i];
unsigned int(8) range_y[i];
unsigned int(8) range_z[i];
unsigned int(8) object_id[i];
}
aligned(8) class PointCloudTimedMetadataSample{
MetadataInformationBox( )[ ];
    PointCloudRegions( )[ ];
}
``` metadata_type specified the type of the point cloud region metadata information. The following value are defined:
  1 indicates a relative quality information for the point cloud regions.
  2 indicates a relative priority information for the point cloud regions.
  4 indicates a heatmap signaling for point cloud regions.
  0 is not allowed. Values 8, 16 and 32 are reserved. Values 64 and 128 are for user-defined metadata types.

viewport_id is the identifier of the viewport for which the metadata is applicable, e.g., priority of different point cloud regions may change depending on the particular viewport. Recommended viewport information may either be signaled at the MPD or timed metadata track in the ISOBMFF.

num_regions specifies the number of point cloud regions.

value specifies the value assigned to a point cloud region which corresponds to the region partition at index [i]. Value can correspond to the quality, priority or heatmap indicator depending on metadata_type.

center_x specifies the value x-coordinate of the center point (or it could be any other reference point on the cube corner) of the cubical point cloud region which corresponds to the region partition at index [i].

center_y specifies the value y-coordinate of the center point (or it could be any other reference point on the cube corner) of the cubical point cloud region which corresponds to the region partition at index [i].

center_z specifies the value z-coordinate of the center point (or it could be any other reference point on the cube corner) of the cubical point cloud region which corresponds to the region partition at index [i].

range_x specifies the x-coordinate length of the cubical point cloud region which corresponds to the region partition at index [i].

range_y specifies the y-coordinate length of the cubical point cloud region which corresponds to the region partition at index [i].

range_z specifies the z-coordinate length of the cubical point cloud region which corresponds to the region partition at index [i].

object_id specifies the object identifier associated with the cubical point cloud region which corresponds to the region partition at index [i].

Potential Solution 2

Described herein is a generic timed metadata track syntax for indicating point cloud regions. The purpose for the timed metadata track is indicated by the track sample entry type. The sample format of all metadata tracks specified in this clause starts with a common part and may be followed by an extension part that is specific to the sample entry of the metadata track. Each sample specifies a point cloud region.

When a point cloud region timed metadata track is linked to one or more media tracks with a 'cdsc' track reference, it describes each media track individually.

Point cloud timed metadata sample shall be a PointCloudTimedMetadataSample, which shall be an array of MetadataInformationBoxes.

The types of information which may be present in the sample shall be indicated in the PointCloudTimedMetadataSampleEntry.

Sample Entry
i. Definition

Exactly one PointCloudRegionConfigBox shall be present in the sample entry. PointCloudRegionConfigBox specifies the shape of the point cloud region specified by the samples.

ii. Syntax
Sample Entry Format
The track sample entry type 'pcmd' shall be used.
The sample entry of this sample type is specified as follows:

```
class PointCloudTimedMetadataSampleEntry( ) extends
PointCloudRegionSampleEntry(type) ('pcmd') {
    unsigned int(8) metadata_type_indicator;
}
``` metadata_type_indicator indicates the types of timed metadata information which may be present in the PointCloudTimedMetadataSample samples that utilize this sample entry.

(metadata_type_indicator & 0x01) equal to 1 indicates a relative quality information for the point cloud regions. A value of 0 indicates lowest quality.

(metadata_type_indicator & 0x02) equal to 2 indicates a relative priority information for the point cloud regions. A value of 0 indicates lowest priority.

(metadata_type_indicator & 0x04) equal to 4 indicates a heatmap signaling for point cloud regions. A value of 0 indicates lowest heatmap value.

Value 0 is not allowed. Bits 3, 4 and 5 in LSB 0 notation are reserved. Bits 6 and 7 in LSB 0 notation are for user-defined metadata types.

```
class PointCloudRegionSampleEntry( ) extends
MetaDataSampleEntry(type) {
    PointCloudRegionConfigBox( ); // mandatory
    Box[ ] other_boxes; // optional
}
class PointCloudRegionConfigBox extends FullBox('pcrc', 0, 0) {
    bit(7) reserved = 0;
    unsigned int(1) dynamic_range_flag;
    if (dynamic_range_flag = = 0) {
        unsigned int(8) static_center_x;
        unsigned int(8) static_center_y;
        unsigned int(8) static_center_z;
        unsigned int(8) static_range_x;
        unsigned int(8) static_range_y;
        unsigned int(8) static_range_z;
    }
    unsigned int(8) num_regions;
}
``` iii. Semantics dynamic_range_flag equal to 0 specifies that the coordinates of the point cloud region remain unchanged in all samples referring to this sample entry. dynamic_range_flag equal to 1 specifies that the coordinates are indicated in the sample format.

static_center_x specifies the value x-coordinate of the center point (or it could be any other reference point on the cube corner) of the cubical point cloud region.

static_center_y specifies the value y-coordinate of the center point (or it could be any other reference point on the cube corner) of the cubical point cloud region.

static_center_z specifies the value z-coordinate of the center point (or it could be any other reference point on the cube corner) of the cubical point cloud region.

static_range_x specifies the x-coordinate length of the cubical point cloud region.

static_range_y specifies the y-coordinate length of the cubical point cloud region.

static_range_z specifies the z-coordinate length of the cubical point cloud region.

num_regions specifies the number of point cloud regions in the samples referring to this sample entry. num_regions shall be equal to 1. Other values of num_regions are reserved.

Sample Format
iii. Definition
Each sample specifies a point cloud region.
iv. Syntax

```
aligned(8) PointCloudRegionSample( ) {
    for (i = 0; i < num_regions; i++)
        PointCloudRegionStruct(dynamic_range_flag, 1);
}
``` v. Semantics

Let the target media samples be the media samples in the referenced media tracks with composition times greater than or equal to the composition time of this sample and less than the composition time of the next sample.

interpolate equal to 0 specifies that the values of center_x, center_y, center_z, range_x, range_y and range_z in this sample apply to the target media samples. interpolate equal to 1 specifies that the values of center_x, center_y, center_z, range_x, range_y and range_z that apply to the target media samples are linearly interpolated based on composition times, from the values of the corresponding fields in this sample and the previous sample.

The value of interpolate for a sync sample, the first sample of the track, and the first sample of a track fragment shall be equal to 0.

```
aligned(8) PointCloudRegionStruct(interpolate_included_flag) {
    unsigned int(8) center_x;
    unsigned int(8) center_y;
    unsigned int(8) center_z;
    unsigned int(8) range_x;
    unsigned int(8) range_y;
    unsigned int(8) range_z;
    if (interpolate_included_flag) {
        unsigned int(1) interpolate;
        bit(7) reserved = 0;
    }
}
```

Semantics center_x specifies the value x-coordinate of the center point (or it could be any other reference point on the cube corner) of the cubical point cloud region.

center_y specifies the value y-coordinate of the center point (or it could be any other reference point on the cube corner) of the cubical point cloud region.

center_z specifies the value z-coordinate of the center point (or it could be any other reference point on the cube corner) of the cubical point cloud region.

range_x specifies the x-coordinate length of the cubical point cloud region.

range_y specifies the y-coordinate length of the cubical point cloud region.

range_z specifies the z-coordinate length of the cubical point cloud region

The semantics of interpolate are specified by the semantics of the structure containing this instance of PointCloudRegionStruct. When interpolate is not present in this instance of PointCloudRegionStruct, it is inferred as specified in the semantics of the syntax structure containing this instance of PointCloudRegionStruct.

```
aligned(8) class MetadataInformationBox extends FullBox('mibx', 0,
flags) {
unsigned int(8) metadata_type;
unsigned int(8) viewport_id;
for (i = 0; i < num_regions; i++)
    unsigned int(8) value[i];
}
aligned(8) class PointCloudTimedMetadataSample extends
PointCloudRegionSample( ) {
MetadataInformationBox( )[ ];
}
``` metadata_type specified the type of the point cloud region metadata information. The following value are defined:
 1 indicates a relative quality information for the point cloud regions.
 2 indicates a relative priority information for the point cloud regions.
 4 indicates a heatmap signaling for point cloud regions.
 0 is not allowed. Values 8, 16 and 32 are reserved. Values 64 and 128 are for user-defined metadata types.

viewport_id is the identifier of the viewport for which the metadata is applicable, e.g., priority of different point cloud regions may change depending on the particular viewport. Recommended viewport information may either be signaled at the MPD or timed metadata track in the ISOBMFF. Comment: TuC already contains a potential solution using timed metadata track and an MPD-based solution is provided in document TBD.

value specifies the value assigned to a point cloud region which corresponds to the region partition at index [i]. Value can correspond to the quality, priority or heatmap indicator depending on metadata_type.

Systems and Implementations

Figure 7:
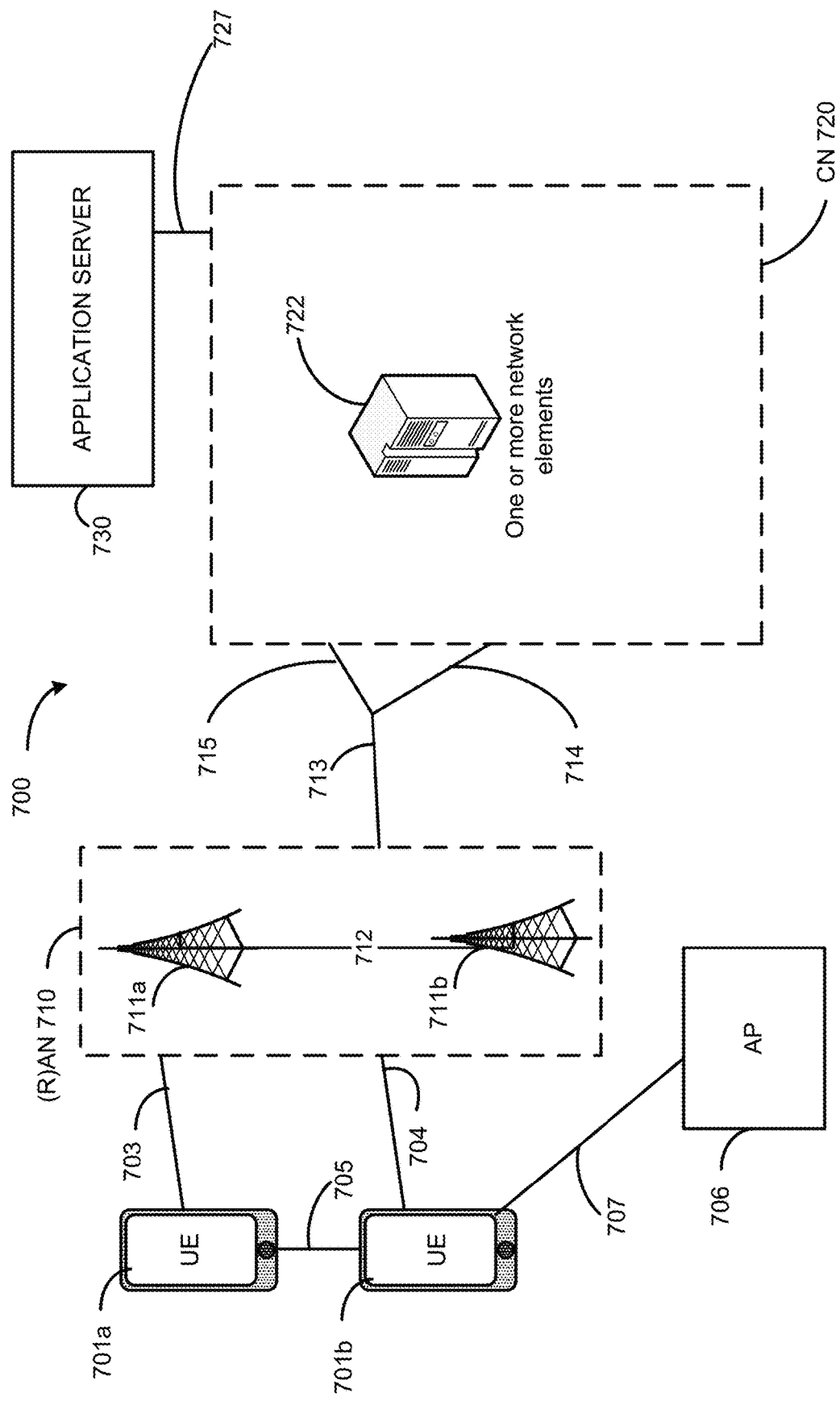
FIG. 7 illustrates an example architecture of a system of a network, in accordance with various embodiments.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701a and UE 701b (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively couple, with an or RAN 710. In embodiments, the RAN 710 may be an NG RAN or a 5G RAN, an E-UTRAN, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation.

The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs (see, e.g., Figure XS1), and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC (e.g., CN XR220 of Figure XR2) via an NG interface (discussed infra).

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701b within a cell) may be performed at any of the RAN nodes 711 based on channel quality information fed back from any of the UEs 701. The downlink resource assignment information may be sent on the PDCCH used for (e.g., assigned to) each of the UEs 701.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 711 may be configured to communicate with one another via interface 712. In embodiments where the system 700 is an LTE system (e.g., when CN 720 is an EPC XR120), the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system (e.g., when CN 720 is a 5GC), the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network—in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs. Embodiments where the CN 720 is a 5GC 720 are discussed in more detail with regard to Figure XR2.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMES.

Figure 8:
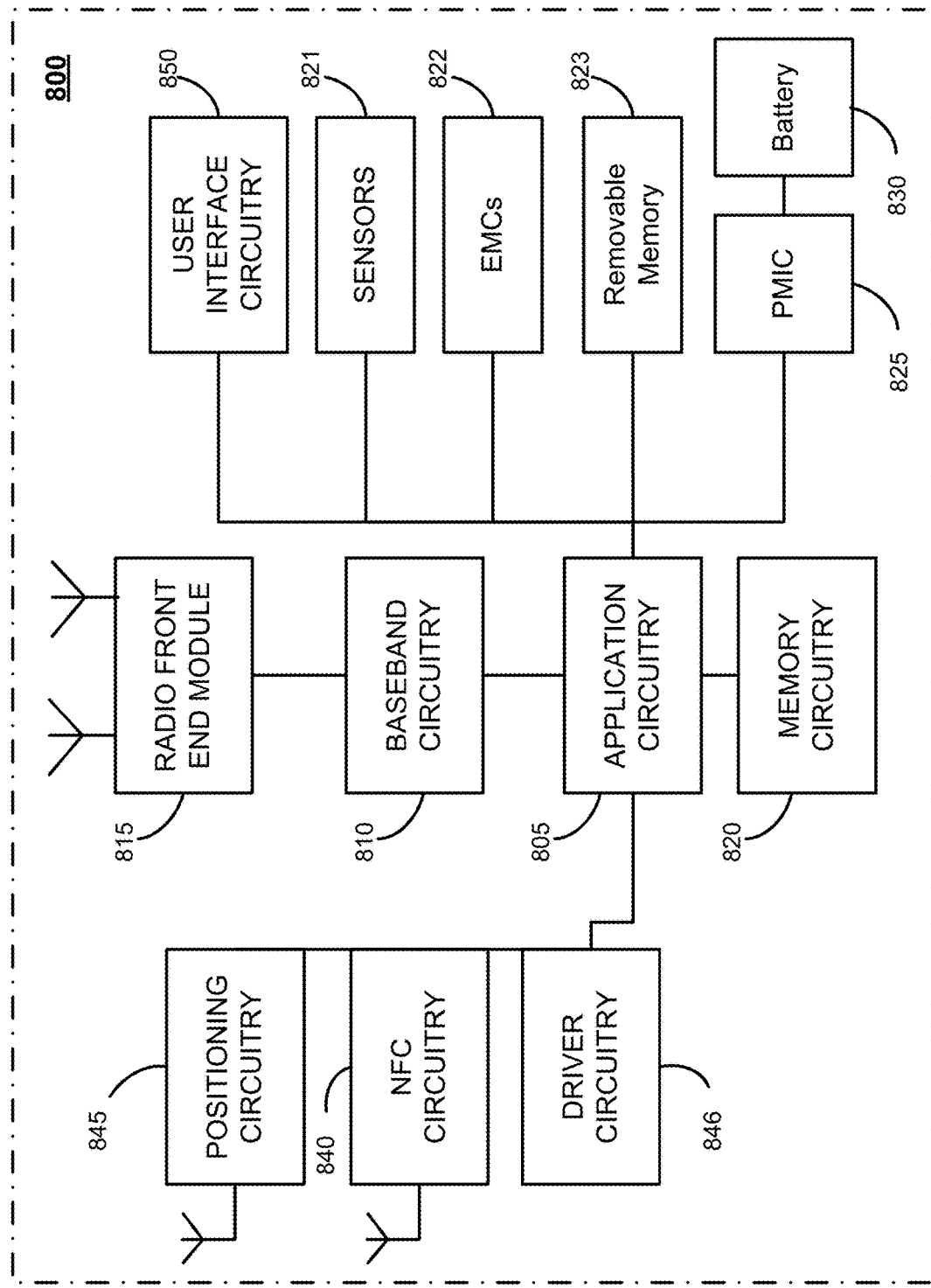
FIG. 8 depicts example components of a computer platform or device in accordance with various embodiments.

FIG. 8 illustrates an example of a platform 800 (or "device 800") in accordance with various embodiments. In embodiments, the computer platform 800 may be suitable for use as UEs 701, application servers 730, a media content server (e.g., DASH content server), and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry XS105 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry XS105 may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 9.

The RFEMs 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signaling to other components of the platform 800 to indicate a current state of the EMCs 822. Examples of the EMCs 822 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry XS110 and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 701.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the battery 830 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 9:
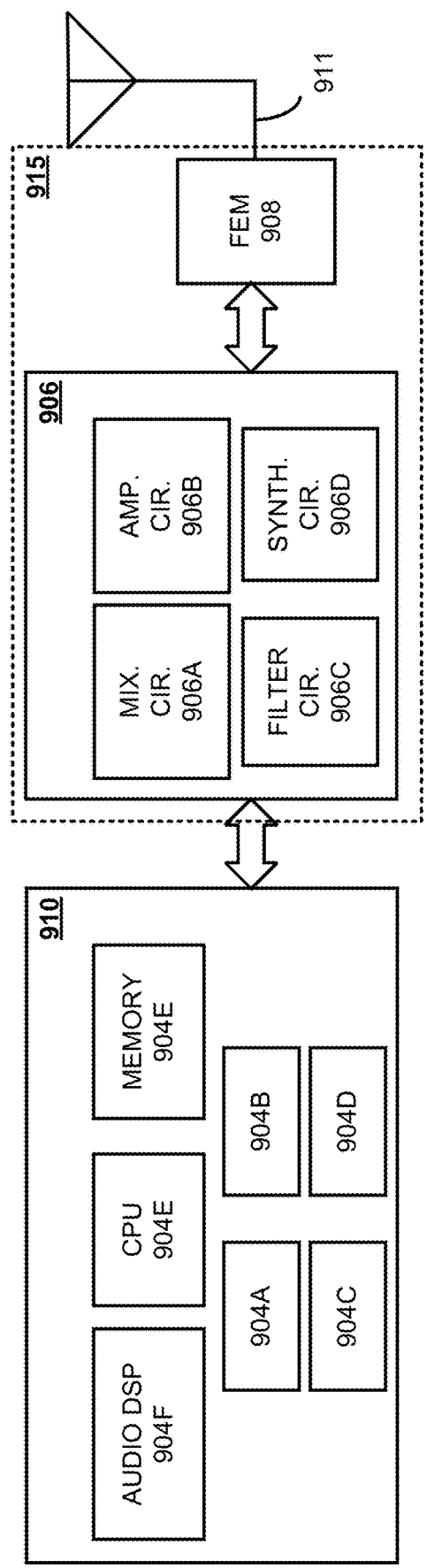
FIG. 9 depicts example components of baseband circuitry and radio frequency end modules in accordance with various embodiments.

FIG. 9 illustrates example components of baseband circuitry 910 and radio front end modules (RFEM) 915 in accordance with various embodiments. The baseband circuitry 910 corresponds to the baseband circuitry 810 of FIG. 8. The RFEM 915 corresponds to the RFEM 815 of FIG. 8. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 805 (see FIG. 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 805 of FIG. 8; an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 805 depending on the desired output frequency. In some embodiments, a divider control input (e.g., N) may be determined from a look-up table based on a channel indicated by the application circuitry 805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
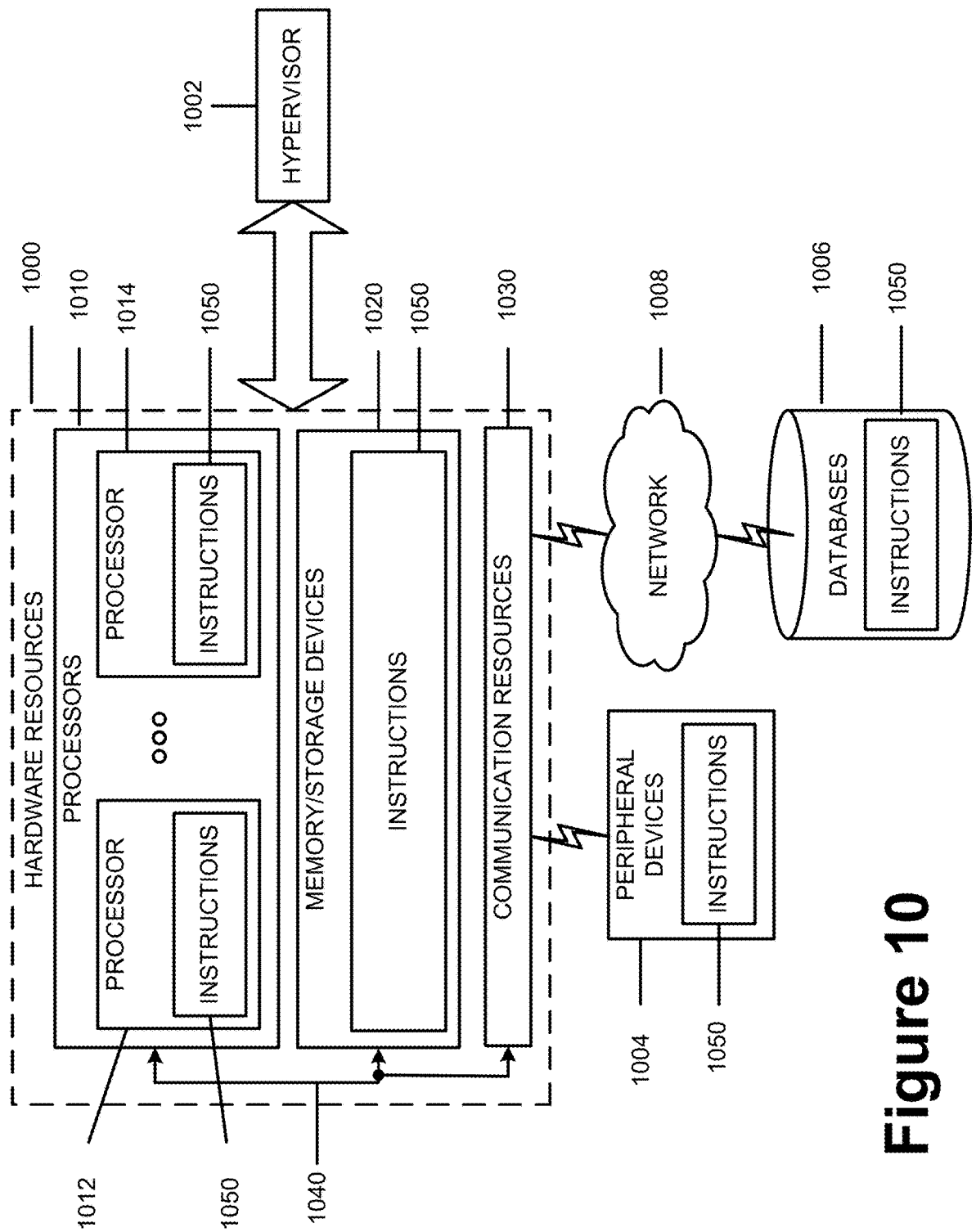
FIG. 10 is a block diagram illustrating components, according to some example embodiments, able to read instructions from a machine-readable or computer-readable medium (for example, a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Example Procedures

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 11:
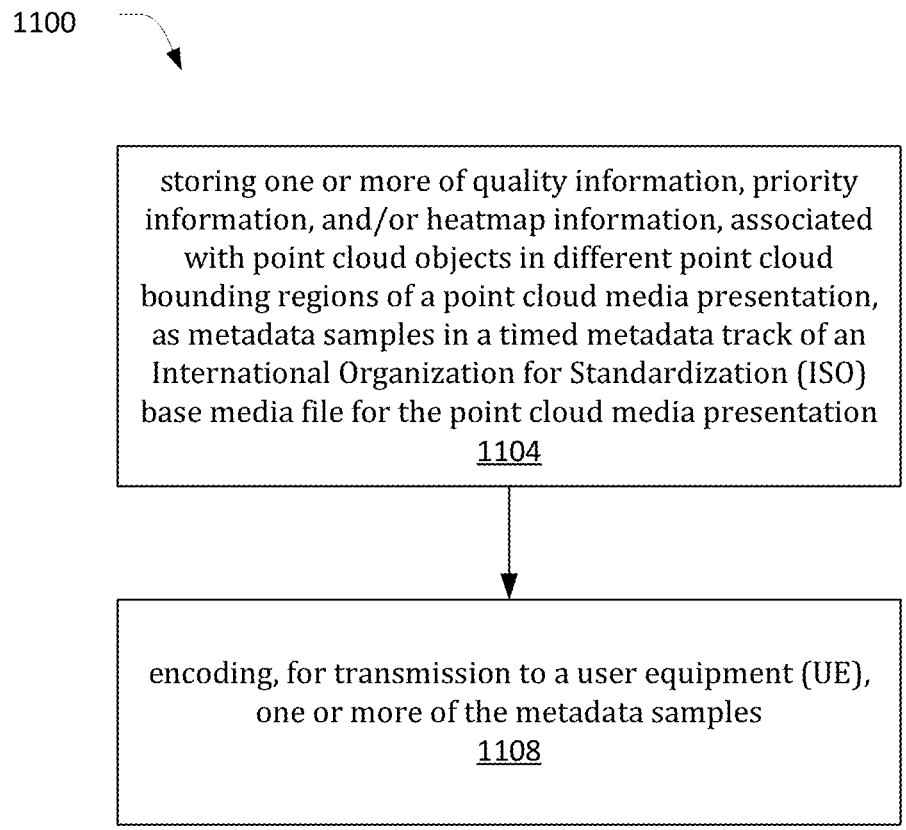
FIG. 11 illustrates an operation flow/algorithmic structure in accordance with some embodiments.

FIG. 11 illustrates another operation flow/algorithmic structure 1100 in accordance with some embodiments. The operation flow/algorithmic structure 1100 may be performed, in part or in whole, by a media content server or components thereof. For example, in some embodiments the operation flow/algorithmic structure 1100 may be performed by the baseband circuitry implemented in the media content server.

At 1104, the operation flow/algorithmic structure 1100 may include storing one or more of quality information or priority information, associated with point cloud objects in different point cloud bounding regions of a point cloud media presentation, as metadata samples in a timed metadata track of an International Organization for Standardization (ISO) base media file for the point cloud media presentation.

At 1108, the operation flow/algorithmic structure 1100 may further include encoding, for transmission to a user equipment (UE), one or more of the metadata samples. For example, the metadata samples may be transmitted to the UE in response to a request from the UE.

In embodiments, the server may further encode, for transmission to the UE, a manifest file for the point cloud media presentation. The manifest file may be, for example, a DASH media presentation description (MPD). In some embodiments, the manifest file may include timed metadata track information associated with the metadata samples (e.g., to enable the UE to request the metadata samples of one or more point cloud bounding regions that correspond to a particular viewport). The manifest file may further include information on representations and/or adaptation sets of the point cloud media file that are available for streaming to the UE. In some embodiments, the representations and/or adaptation sets may be associated with a viewport, e.g., a recommended viewport. The server may receive a request from the UE for one or more representations (e.g., associated with an adaptation set) based on the MPD and/or the at least one of the quality information, priority information, or heatmap information.

Figure 12:
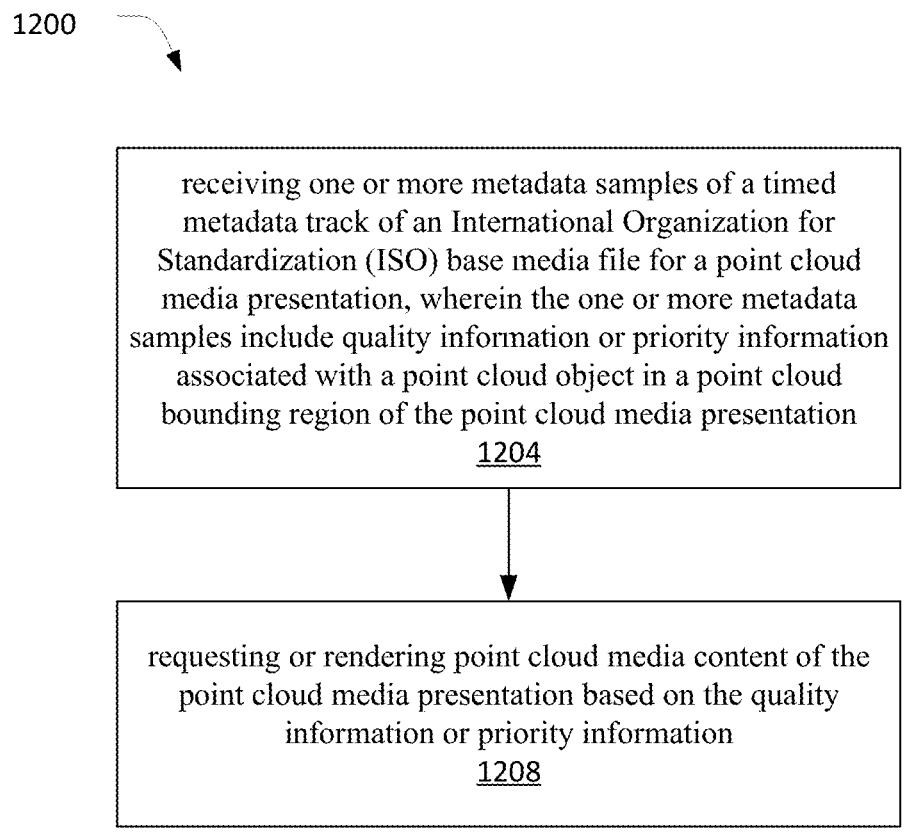
FIG. 12 illustrates another operation flow/algorithmic structure in accordance with some embodiments.

FIG. 12 illustrates an operation flow/algorithmic structure 1200 in accordance with some embodiments. The operation flow/algorithmic structure 1200 may be performed, in part or in whole, by a UE (e.g., UE 701*a* and/or UE 701*b* in FIG. 7) or components thereof. For example, in some embodiments the operation flow/algorithmic structure 1200 may be performed by the baseband circuitry implemented in the UE.

At 1204, the operation flow/algorithmic structure 1200 may include receiving one or more metadata samples of a timed metadata track of an International Organization for Standardization (ISO) base media file for a point cloud media presentation, wherein the one or more metadata samples include quality information or priority information associated with a point cloud object in a point cloud bounding region of the point cloud media presentation. The metadata samples may be received from a server, e.g., a media content server that may also store the point cloud media content of the point cloud media presentation.

At 1208, the operation flow/algorithmic structure 1200 may further include requesting or rendering point cloud media content of the point cloud media presentation based on the quality information or priority information. For example, the UE may request one or more representations (e.g., associated with an adaptation set) of the point cloud content based on the quality information and/or priority information. Additionally, or alternatively, when rendering the content, the UE may prioritize the point cloud content for point cloud object over other objects/portions of the point cloud bounding region based on the quality information and/or priority information.

In embodiments, the UE may further receive, from the server, a manifest file for the point cloud media presentation. The manifest file may be, for example, a DASH media presentation description (MPD). In some embodiments, the manifest file may include timed metadata track information associated with the metadata samples (e.g., to enable the UE to request the metadata samples of one or more point cloud bounding regions that correspond to a particular viewport). The manifest file may further include information on representations and/or adaptation sets of the point cloud media file that are available for streaming to the UE. In some embodiments, the representations and/or adaptation sets may be associated with a viewport, e.g., a recommended viewport. The UE may request one or more representations (e.g., associated with an adaptation set) from the server based on the MPD and/or the at least one of the quality information, priority information, or heatmap information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include one or more non-transitory computer-readable media (NTCRM) having instructions, stored thereon, that when executed by one or more processors cause a server to: store one or more of quality information or priority information information, associated with point cloud objects in different point cloud bounding regions of a point cloud media presentation, as metadata samples in a timed metadata track of an ISO base media file for the point cloud media presentation; and encode, for transmission to a user equipment, one or more of the metadata samples.

Example 2 may include the one or more NTCRM of example 1 or some other example herein, wherein the metadata samples further include a viewport identifier to indicate a viewport associated with the metadata sample.

Example 3 may include the one or more NTCRM of example 2 or some other example herein, wherein the instructions, when executed, further cause the server to encode, for transmission to the UE, a dynamic adaptive streaming over hypertext transfer protocol (DASH) media presentation description (MPD) with recommended viewport information to indicate one or more recommended viewports.

Example 4 may include the one or more NTCRM of example 3 or some other example herein, wherein the MPD includes timed metadata track information to enable the UE to access the metadata samples for the one or more recommended viewports.

Example 5 may include the one or more NTCRM of example 1-4 or some other example herein, wherein the point cloud bounding regions are cubical or spherical.

Example 6 may include the one or more NTCRM of example 1-5 or some other example herein, wherein one or more of the point cloud bounding regions are associated with a specific point cloud object with an object identifier.

Example 7 may include the one or more NTCRM of example 1-6 or some other example herein, wherein the metadata samples include the priority information, and wherein the priority information indicates a priority of the respective point cloud object in the respective point cloud bounding region compared with other point cloud objects in the same point cloud bounding region.

Example 8 may include the one or more NTCRM of example 1-7 or some other example herein, wherein the metadata samples include the quality information, and wherein the quality information indicates a quality of the respective point cloud object in the respective point cloud bounding region compared with other point cloud objects in the same bounding region.

Example 9 may include the one or more NTCRM of example 1-8 or some other example herein, wherein the metadata samples further include an indication of a number of the point cloud bounding regions in the point cloud media presentation or associated with a specific viewport.

Example 10 may include the one or more NTCRM of example 1-9 or some other example herein, wherein the metadata samples further include parameters to define the associated point cloud bounding region.

Example 11 may include one or more non-transitory computer-readable media (NTCRM) having instructions, stored thereon, that when executed by one or more processors cause a user equipment (UE) to: receive one or more metadata samples of a timed metadata track of an International Organization for Standardization (ISO) base media file for a point cloud media presentation, wherein the one or more metadata samples include quality information or priority information associated with a point cloud object in a point cloud bounding region of the point cloud media presentation; and request or render point cloud media content of the point cloud media presentation based on the quality information or priority information.

Example 12 may include the one or more NTCRM of example 11 or some other example herein, wherein the one or more metadata samples further include a viewport identifier to indicate a viewport associated with the respective metadata sample.

Example 13 may include the one or more NTCRM of example 12 or some other example herein, wherein the instructions, when executed, further cause the UE to receive a dynamic adaptive streaming over hypertext transfer protocol (DASH) media presentation description (MPD) with recommended viewport information to indicate one or more recommended viewports.

Example 14 may include the one or more NTCRM of example 13 or some other example herein, wherein the MPD includes timed metadata track information, wherein the instructions, when executed, further cause the UE to send a request for the one or more metadata samples based on the timed metadata track information.

Example 15 may include the one or more NTCRM of example 11-14 or some other example herein, wherein the point cloud bounding regions are cubical or spherical.

Example 16 may include the one or more NTCRM of example 11-15 or some other example herein, wherein one or more of the point cloud bounding regions are associated with a specific point cloud object with an object identifier.

Example 17 may include the one or more NTCRM of example 11-16 or some other example herein, wherein the one or more metadata samples include the priority information, and wherein the priority information indicates a priority of the respective point cloud object in a point cloud bounding region compared with other point cloud objects in the point cloud bounding region.

Example 18 may include the one or more NTCRM of example 11-17 or some other example herein, wherein the one or more metadata samples include the quality information, and wherein the quality information indicates a quality of the respective point cloud object in a point cloud bounding region compared with other point cloud objects in the point cloud bounding region.

Example 19 may include the one or more NTCRM of example 11-18 or some other example herein, wherein the one or more metadata samples further include an indication of a number of the point cloud bounding regions in the point cloud media presentation or associated with a specific viewport.

Example 20 may include the one or more NTCRM of example 11-19 or some other example herein, wherein the metadata samples further include parameters to define the associated point cloud bounding region.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, packet, frame, segment, protocol data unit (PDU), or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, packet, frame, segment, protocol data unit (PDU), or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. One or more non-transitory computer-readable media (NTCRM) having instructions, stored thereon, that when executed by one or more processors cause a server to:
store priority information, associated with point cloud objects in different point cloud bounding regions of a point cloud media presentation, as metadata samples in a timed metadata track of an International Organization for Standardization (ISO) base media file for the point cloud media presentation, wherein the priority information indicates a priority of the respective point cloud object in the respective point cloud bounding region compared with other point cloud objects in the same point cloud bounding region; and encode, for transmission to a user equipment (UE), one or more of the metadata samples.

2. The one or more NTCRM of claim 1, wherein the metadata samples further include a viewport identifier to indicate a viewport associated with the respective metadata sample.

3. The one or more NTCRM of claim 2, wherein the instructions, when executed, further cause the server to encode, for transmission to the UE, a dynamic adaptive streaming over hypertext transfer protocol (DASH) media presentation description (MPD) with recommended viewport information to indicate one or more recommended viewports.

4. The one or more NTCRM of claim 3, wherein the MPD includes timed metadata track information to enable the UE to access the metadata samples for the one or more recommended viewports.

5. The one or more NTCRM of claim 1, wherein the point cloud bounding regions are cubical or spherical.

6. The one or more NTCRM of claim 1, wherein one or more of the point cloud bounding regions are associated with a specific point cloud object with an object identifier.

7. The one or more NTCRM of claim 1, wherein the metadata samples further include quality information, and wherein the quality information indicates a quality of the respective point cloud object in the respective point cloud bounding region compared with other point cloud objects in the same bounding region.

8. The one or more NTCRM of claim 1, wherein the metadata samples further include an indication of a number of the point cloud bounding regions in the point cloud media presentation or associated with a specific viewport.

9. The one or more NTCRM of claim 1, wherein the metadata samples further include parameters to define the associated point cloud bounding region.

10. One or more non-transitory computer-readable media (NTCRM) having instructions, stored thereon, that when executed by one or more processors cause a user equipment (UE) to:

receive one or more metadata samples of a timed metadata track of an International Organization for Standardization (ISO) base media file for a point cloud media presentation, wherein the one or more metadata samples include priority information associated with a point cloud object in a point cloud bounding region of the point cloud media presentation, wherein the priority information indicates a priority of the respective point cloud object in the point cloud bounding region compared with other point cloud objects in the point cloud bounding region; and request or render point cloud media content of the point cloud media presentation based on the priority information.

11. The one or more NTCRM of claim 10, wherein the one or more metadata samples further include a viewport identifier to indicate a viewport associated with the respective metadata sample.

12. The one or more NTCRM of claim 11, wherein the instructions, when executed, further cause the UE to receive a dynamic adaptive streaming over hypertext transfer protocol (DASH) media presentation description (MPD) with recommended viewport information to indicate one or more recommended viewports.

13. The one or more NTCRM of claim 12, wherein the MPD includes timed metadata track information, wherein the instructions, when executed, further cause the UE to send a request for the one or more metadata samples based on the timed metadata track information.

14. The one or more NTCRM of claim 10, wherein the point cloud bounding region is cubical or spherical.

15. The one or more NTCRM of claim 10, wherein the point cloud bounding region is associated with a specific point cloud object with an object identifier.

16. The one or more NTCRM of claim 10, wherein the one or more metadata samples further include quality information, and wherein the quality information indicates a quality of the respective point cloud object in the point cloud bounding region compared with other point cloud objects in the point cloud bounding region.

17. The one or more NTCRM of claim 10, wherein the point cloud bounding region is a first point cloud bounding region, and wherein the one or more metadata samples further include an indication of a number of point cloud bounding regions, including the first point cloud bounding region, in the point cloud media presentation or associated with a specific viewport.

18. The one or more NTCRM of claim 10, wherein the metadata samples further include parameters to define the associated point cloud bounding region.

19. One or more non-transitory computer-readable media (NTCRM) having instructions, stored thereon, that when executed by one or more processors cause a server to:

store quality information, associated with point cloud objects in different point cloud bounding regions of a point cloud media presentation, as metadata samples in a timed metadata track of an International Organization for Standardization (ISO) base media file for the point cloud media presentation, wherein the quality information indicates a quality of the respective point cloud object in the respective point cloud bounding region compared with other point cloud objects in the same bounding region; and encode, for transmission to a user equipment, one or more of the metadata samples.

20. The one or more NTCRM of claim 19, wherein the metadata samples further include an indication of a number of the point cloud bounding regions in the point cloud media presentation or associated with a specific viewport.

21. The one or more NTCRM of claim 19, wherein the metadata samples further include parameters to define the associated point cloud bounding region.

22. One or more non-transitory computer-readable media (NTCRM) having instructions, stored thereon, that when executed by one or more processors cause a server to:

store one or more of quality information or priority information, associated with point cloud objects in different point cloud bounding regions of a point cloud media presentation, as metadata samples in a timed metadata track of an International Organization for Standardization (ISO) base media file for the point cloud media presentation, wherein the metadata samples further include an indication of a number of the point cloud bounding regions in the point cloud media presentation or associated with a specific viewport; and encode, for transmission to a user equipment, one or more of the metadata samples.

23. The one or more NTCRM of claim 22, wherein the metadata samples further include parameters to define the associated point cloud bounding region.

24. One or more non-transitory computer-readable media (NTCRM) having instructions, stored thereon, that when executed by one or more processors cause a user equipment (UE) to:
   receive one or more metadata samples of a timed metadata track of an International Organization for Standardization (ISO) base media file for a point cloud media presentation, wherein the one or more metadata samples include quality information associated with a point cloud object in a point cloud bounding region of the point cloud media presentation, wherein the quality information indicates a quality of the respective point cloud object in the point cloud bounding region compared with other point cloud objects in the point cloud bounding region; and
   request or render point cloud media content of the point cloud media presentation based on the quality information or priority information.

25. The one or more NTCRM of claim 24, wherein the point cloud bounding region is a first point cloud bounding region, and wherein the one or more metadata samples further include an indication of a number of point cloud bounding regions, including the first point cloud bounding region, in the point cloud media presentation or associated with a specific viewport.

26. The one or more NTCRM of claim 24, wherein the metadata samples further include parameters to define the associated point cloud bounding region.

27. One or more non-transitory computer-readable media (NTCRM) having instructions, stored thereon, that when executed by one or more processors cause a user equipment (UE) to:
   receive one or more metadata samples of a timed metadata track of an International Organization for Standardization (ISO) base media file for a point cloud media presentation, wherein the one or more metadata samples include quality information or priority information associated with a point cloud object in a point cloud bounding region of the point cloud media presentation, wherein the one or more metadata samples further include an indication of a number of the point cloud bounding regions in the point cloud media presentation or associated with a specific viewport; and
   request or render point cloud media content of the point cloud media presentation based on the quality information or priority information.

28. The one or more NTCRM of claim 27, wherein the metadata samples further include parameters to define the associated point cloud bounding region.

* * * * *

UNITED STATES PATENT AND TRADEMARK OFFICE
CERTIFICATE OF CORRECTION

PATENT NO. : 11,704,867 B2  
APPLICATION NO. : 17/032630  
DATED : July 18, 2023  
INVENTOR(S) : Ozgur Oyman Page 1 of 1

It is certified that error appears in the above-identified patent and that said Letters Patent is hereby corrected as shown below:

In the Claims

Column 40
Line 22, add "the" after "information or" and before "priority information".

Signed and Sealed this  
Fifth Day of September, 2023

*Katherine Kelly Vidal*

Katherine Kelly Vidal  
*Director of the United States Patent and Trademark Office*